March 13, 1951 H. R. SMITH 2,545,244
ELECTRONIC CIRCUIT VOLTAGE CONTROL
Filed Jan. 15, 1949
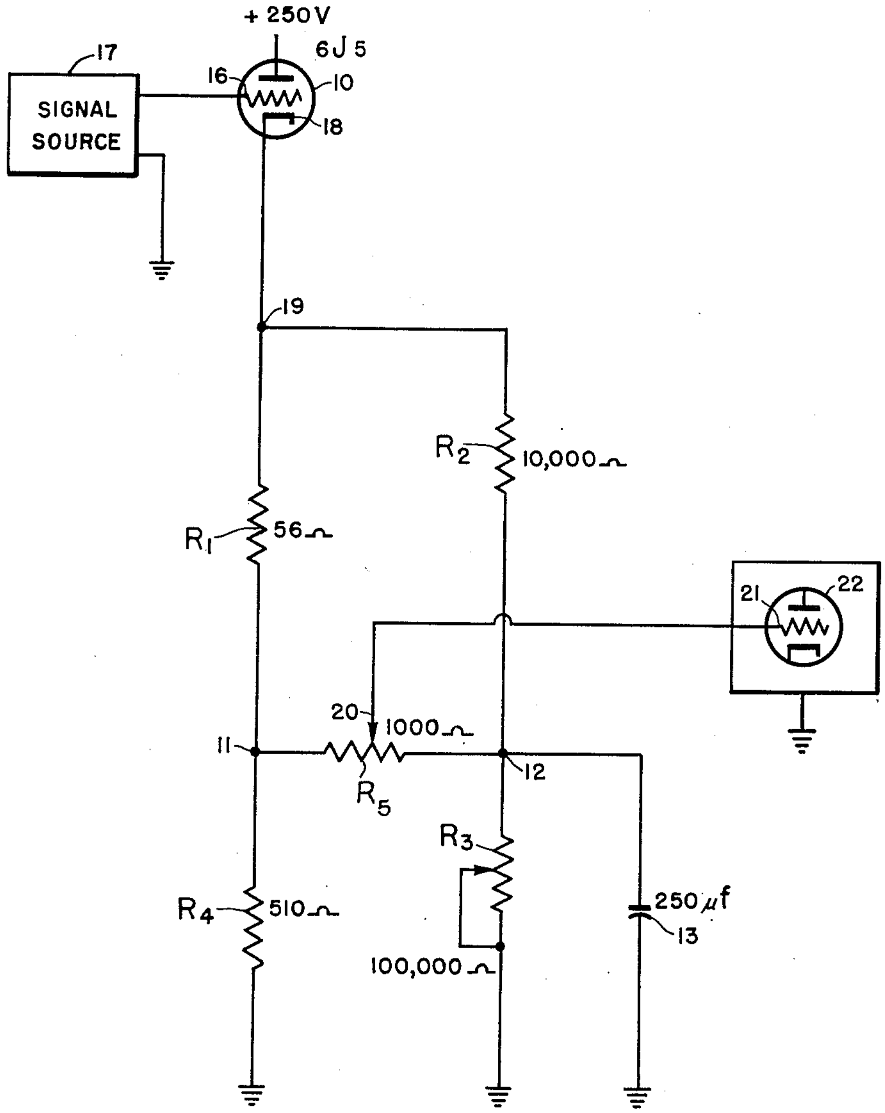
INVENTOR.
Harry R. Smith
BY Darby & Darby
ATTORNEYS Patented Mar. 13, 1951 2,545,244

UNITED STATES PATENT OFFICE 2,545,244

ELECTRONIC CIRCUIT VOLTAGE CONTROL

Harry R. Smith, Glen Ridge, N. J., assignor to Allen B. Du Mont Laboratories, Inc., Passaic, N. J., a corporation of Delaware Application January 15, 1949, Serial No. 71,187

7 Claims. (Cl. 178—44)

This invention relates to electronic circuit voltage attenuator circuits.

In certain electronic circuit apparatus such as cathode ray oscillograph and like instruments where high amplification of low frequency signal voltages is sometimes necessary, a disturbance manifests itself when the D. C. voltage level on one of the amplifier grids is substantially changed. This disturbance, known in the art as "bop" consists in fluctuations of the signal immediately following the voltage change. These fluctuations may be so extreme that, in the case of an oscillograph, the cathode ray spot will completely vanish from the screen of the tube or will oscillate wildly across the screen many times before settling back to normal operation.

If the gain control of a circuit is part of a direct current coupling to a grid of one of the amplifier tubes, variation of the gain control will cause the "bop." One way of avoiding this is to couple the grid of the amplifier tube to the signal source through a capacitor. A large value of capacitance is required, however, when low frequency voltages are involved. Under these conditions, the large capacitor may have a mechanical structure causing electrical leakage deleterious to the operation of the circuit.

It is an object of this invention to eliminate the cathode ray fluctuations due to varying the gain control potentiometer.

It is another object of this invention to provide a coupling circuit which will eliminate cathode ray fluctuations and which will avoid the use of a large capacitor in the coupling line and thus avoid the undesired leakage.

Further objects will be apparent after the following description, claims and drawing in which the only figure is a circuit diagram illustrating one embodiment of the invention.

In accordance with this invention, a plurality of resistive impedances are connected as a Wheatstone bridge balanced to prevent change of D. C. voltage components from the output terminals thereof. A reactance such as a capacitor is connected across one leg of the bridge so as to cause the bridge to be unbalanced when A. C. signal components are applied thereto. Referring now in more detail to the drawing, it may be seen that in accordance with one embodiment of the invention a thermionic tube 10 may be connected in the electronic circuit having the input grid 16 thereof connected to a signal source 17. This tube 10 is connected in the circuit as a cathode follower. The anode of the tube is connected to a source of positive voltage. The cathode 18 is connected through a pair of resistances R1 and R4 in series to ground. A second pair of resistances R2 and R3 are connected to ground in parallel with resistances R1 and R4. A potentiometer R5 is connected between the juncture of resistances R1 and R4 represented by the reference numeral 11 and a juncture of the resistances R2 and R3 represented by the reference numeral 12. Thus, a Wheatstone bridge network is provided in the cathode lead of the tube 10.

In accordance with well known practice, this bridge network may be properly balanced so that no direct current components will appear across the diagonal points 11 and 12 and the potentiometer R5 by choosing the values of the resistances so that $R1R3=R2R4$. The input terminals to the bridge circuit comprise the connection to the cathode 18 of the tube 10 represented by the reference numeral 19 and ground. No direct current will flow through the potentiometer R5 connected across the opposite diagonals of the bridge since there is no difference of potential between these diagonal points 11 and 12 when the bridge is balanced. In practice, one leg of the bridge represented by the resistance R3 may be made variable as shown if desired, in order to balance precisely the bridge network. It will be apparent that if the resistance values are carefully chosen such variable resistance is not necessary.

In accordance with this invention, the output of the bridge network may be taken from the tap 20 of the potentiometer R5 to ground. In other words, the output is taken from the tap of the potentiometer to one of the input terminals of the bridge network. Accordingly, the tap 20 of the potentiometer R5 may be connected direct to an input grid 21 of a following amplifier tube 22 as shown.

The D. C. components resulting from the operation of the tube 10, i. e., the current flow in the cathode lead, will be balanced by the bridge network and no change will be apparent on the grid 21 of the following tube when the potentiometer R5, which is the gain control potentiometer for the circuit, is varied.

In order that the desired signal may appear across the potentiometer R5, the bridge may be unbalanced for alternating currents by connecting a capacitor 13 between the diagonal point 12 of the bridge network and ground, i. e., across one of the resistance legs R3. The reactance of this capacitor 13 may be made sufficiently low in value with respect to the value of resistance R3 so that the diagonal point 12 to which the capacitor is connected is essentially grounded for alternating currents. This effect may be more readily accomplished by choosing the value of resistance R3 so that it will be a multiple, for instance 100 times the value of the resistance R4 in the other leg of the bridge. In accordance with well known practice, it will then be necessary to choose the value of resistance R2 so that it will have the same multiple or will be the same number of times as great as the resistance R1.

When the capacitor 13 is sufficiently large so that the diagonal point 12 may be considered to be grounded for alternating currents, the gain control potentiometer R5 is effectively shunted across the cathode resistance R4 and the resistance R2 in the opposite leg of the bridge is effectively shunted across the pair of series cathode resistances R1 and R4. This resistance R2 preferably has a value sufficiently high to prevent it from loading the cathode resistors R1 and R4. The values shown in the drawing have been used in an operable circuit. However, it will be apparent that the invention is not limited to these values.

With this arrangement, it may be seen that the D. C. component is balanced so that no change will appear on the grid 21 of the amplifier tube 22. At the same time the bridge is unbalanced for alternating currents so that the desired signal will be impressed upon the amplifier tube grid 21. In so doing, there is no undesired leakage caused by a capacitor in series with a coupling network. The gain control for the desired signal may be varied at will without the "bop" referred to earlier resulting from D. C. voltage changes.

The bridge circuit is illustrated as being in the cathode of a tube as a cathode follower amplifier circuit. This may be preferred in some instances to take advantage of the low impedance output characteristics of the cathode follower circuit and thus make possible the use of low values of resistance in the cathode lead. This arrangement is not essential, however, and it will be apparent that the bridge network may be used in other parts of the circuit such as, for instance, in the grid circuit of a tube. Other embodiments will be apparent to those skilled in the art and they may be used without departing from the scope of the invention.

What is claimed is:

1. A voltage gain control circuit comprising a plurality of resistances connected as a Wheatstone bridge having a source of signal voltage connected across one diagonal thereof, a potentiometer connected across the other diagonal thereof and a reactance connected across one leg of said bridge, said signal voltage comprising A. C. and D. C. voltage components, said bridge being balanced for said D. C. components and unbalanced for said A. C. components.

2. A voltage gain control circuit comprising a plurality of resistances connected as a Wheatstone bridge having a source of signal voltage connected to terminals across one diagonal thereof, a potentiometer connected across the other diagonal thereof, a capacitance connected across one leg thereof, and output terminals comprising the tap of said potentiometer and one of said terminals, said signal voltage having A. C. and D. C. components, said bridge being balanced for said D. C. components and unbalanced for said A. C. components.

3. A voltage gain control circuit comprising a thermionic tube having a plate and a cathode, a load for said tube connected in series with said plate and said cathode, said load comprising a D. C. balanced resistive Wheatstone bridge network having terminals across one diagonal thereof connected to said tube in the D. C. circuit thereof, a potentiometer connected across the other diagonal of said bridge and a reactance connected across one leg of said bridge.

4. A voltage gain control circuit comprising a thermionic tube having a plate and a cathode, a D. C. balanced resistive Wheatstone bridge network having terminals across one diagonal connected in the cathode circuit of said tube, a potentiometer connected across the other diagonal of said bridge, a capacitance connected across one leg of said bridge to unbalance said bridge for alternating current, said tube and said bridge forming a network in which the input terminals thereof comprise the grid of said tube and one diagonal terminal of said bridge, and the output terminals thereof comprise the tap of said potentiometer and said diagonal terminal of said bridge.

5. A voltage gain control device comprising a bridge circuit consisting of a first resistor, a second resistor, a third resistor and a fourth resistor; two input terminals adapted to receive a signal voltage having A. C. and D. C. components, one of said terminals being the junction of said first and second resistors and the second of said terminals being the junction of said third and fourth resistors; a gain control potentiometer having two ends and a slidable contact, one of said ends being connected to the junction of said first and fourth resistors and the other of said ends connected to the junction of said second and third resistors; a pair of output terminals from which the signal is taken, one of said output terminals consisting of one of said input terminals and the other output terminal being connected to the arm of said gain control potentiometer; a capacitor in parallel with said third resistor, said bridge being balanced for said D. C. components and unbalanced for said A. C. components.

6. In a voltage gain control device a bridge circuit comprising a first resistor, a second resistor, a third resistor, and a fourth resistor connected in series, a pair of input terminals, the first of said input terminals being the junction of said first resistor and said second resistor, and the second of said input terminals being the junction of said third resistor and said fourth resistor; a potentiometer having two end terminals and a movable contactor, one of the end terminals connected to the junction of said fourth resistor and said first resistor and the other end terminal connected to the junction of said second resistor and said third resistor; a condenser connected across said third resistor; and a pair of output terminals, one of which comprises the movable contact on said potentiometer and the other of said output terminals comprises the second of said input terminals, said bridge being balanced for direct current and unbalanced for alternating current voltage components.

7. In a voltage gain control device operating over a low range of frequencies, a D. C. balanced bridge circuit comprising a first resistor, a second resistor, a third resistor and a fourth resistor connected in series, a vacuum tube connected as a cathode follower amplifier, said bridge forming the cathode load for said tube and being connected to said cathode at the junction of said first and second resistors, the junction of said third and fourth resistors being connected to ground, a condenser in parallel with said third resistor to render the impedance of said parallel combination relatively low for all alternating frequencies of the operating range, a potentiometer having two ends and a slidable contact, one of said ends being connected to the junction of said third and fourth resistors, and the other of said ends being connected to the junction of said second and third resistors, and two output terminals, one of said output terminals comprising an arm of said potentiometer and the other output terminal comprising the junction of said third and fourth resistors.

HARRY R. SMITH.

REFERENCES CITED

The following references are of record in the file of this patent:

UNITED STATES PATENTS

| Number | Name | Date |
|---|---|---|
| 1,925,512 | Wright | Sept. 5, 1933 |
| 2,192,035 | Evans | Feb. 27, 1940 |
| 2,225,337 | Fyler | Dec. 17, 1940 |
| 2,440,682 | Hansel | May 4, 1948 |
| 2,443,864 | MacAuley | June 22, 1948 |